United States Patent
Nakamura

(10) Patent No.: US 8,460,735 B2
(45) Date of Patent: Jun. 11, 2013

(54) METHOD FOR PRODUCING SOY SAUCE POWDER

(75) Inventor: Satoru Nakamura, Chiba (JP)

(73) Assignee: Kikkoman Corporation, Noda-shi (JP)

( * ) Notice: Subject to any disclaimer, the term of this patent is extended or adjusted under 35 U.S.C. 154(b) by 134 days.

(21) Appl. No.: 12/794,017

(22) Filed: Jun. 4, 2010

(65) Prior Publication Data

US 2010/0310744 A1 Dec. 9, 2010

(30) Foreign Application Priority Data

Jun. 5, 2009 (JP) ................................ 2009-135729

(51) Int. Cl.
*A23L 1/238* (2006.01)

(52) U.S. Cl.
USPC .......................................... 426/589; 426/443

(58) Field of Classification Search
USPC .......................................... 426/431, 443, 589
See application file for complete search history.

(56) References Cited

U.S. PATENT DOCUMENTS 4,794,015 A * 12/1988 Fujita et al. .................. 426/589

FOREIGN PATENT DOCUMENTS

| JP | 50-18076 | 6/1975 |
|---|---|---|
| JP | 51-6231 | 2/1976 |
| JP | 2007-222068 | 9/2007 |
| JP | 2007222068 A * | 9/2007 |

OTHER PUBLICATIONS

Extended European Search Report issued Sep. 29, 2010, in European Patent Application No. 10251036.9.

* cited by examiner

*Primary Examiner* — Jyoti Chawla
(74) *Attorney, Agent, or Firm* — Oblon, Spivak, McClelland, Maier & Neustadt, L.L.P.

(57) ABSTRACT

This invention provides a soy sauce powder having a strong and preferable soy sauce-derived flavor with simple operations in an advantageous manner in industrial practice and without the need of a step of, for example, preparing an aromatic substance by distilling soy sauce oil with the use of water vapor. This invention also provides a soy sauce powder having a strong and preferable soy sauce-derived flavor by adding an emulsifier such as glycerin fatty acid ester to soy sauce, mixing the soy sauce with soy sauce oil, agitating the mixture, allowing the mixture to stand still, separating the mixture into an oil phase and an aqueous phase so as to obtain an aqueous phase containing soy sauce-derived aroma components at high concentrations, and subjecting the obtained aqueous phase to spray drying.

14 Claims, No Drawings

METHOD FOR PRODUCING SOY SAUCE POWDER

BACKGROUND OF THE INVENTION

1. Field of the Invention

The present invention relates to a method for producing a soy sauce powder having a preferable soy sauce-derived flavor (hereinafter referred to as "soy sauce flavor"), which comprises simple operations in an advantageous manner in industrial practice.

2. Background Art

In general, soy sauce powders are produced by adding an excipient such as dextrin to soy sauce, dissolving dextrin therein, and subjecting the resultant to spray drying. However, preferable volatile components of soy sauce decrease during spray drying, resulting in the partial loss of soy sauce flavor, which is a drawback.

At present, the following known methods exist for overcoming the above drawback: a method for adding an aromatic substance having a brewed aroma with a strong aromatic trace to a soy sauce powder, comprising obtaining the aromatic substance by adding water to soy sauce oil, sufficiently agitating the resultant, separating an aqueous phase therefrom, mixing dextrin with the aqueous phase, and carrying out powderization via drying (see, for example, JP Patent Publication (Kokoku) No. 51-6231 B (1976)); and a method for obtaining a soy sauce powder having an improved aroma, comprising distilling soy sauce oil with the use of water vapor, ethanol vapor, or the like by a general method, adding the appropriate amount of the obtained distillate (aromatic substance) to a soy sauce used as a starting material, adding dextrin thereto, mixing the resultant, and carrying out spray drying (see, for example, JP Patent Publication (Kokoku) No. 50-18076 B (1975)). However, both methods require a step of preparing an aromatic substance. This might result in the partial loss of soy sauce flavor during spray drying, which is problematic.

SUMMARY OF THE INVENTION

It is an object of the present invention to obtain a soy sauce powder having a strong soy sauce flavor using simple operations in an advantageous manner in industrial practice.

As a result of intensive studies in order to achieve the above object, the present inventor has found that a soy sauce powder having a very strong soy sauce flavor can be readily obtained by mixing soy sauce oil and an emulsifier with a soy sauce, agitating the mixture, allowing the mixture to stand still so as to separate the mixture into an oil phase and an aqueous phase, and subjecting the aqueous phase to spray drying with simple operations and without the need of a step of preparing an aromatic substance. The present inventor has completed the present invention based on the above finding.

Specifically, the present invention encompasses a method for producing a soy sauce powder described below:
(1) a method for producing a soy sauce powder, comprising mixing soy sauce oil and an emulsifier with a soy sauce, agitating the mixture, allowing the mixture to stand still so as to separate the mixture into an oil phase and an aqueous phase, and subjecting the aqueous phase to spray drying.

The present application claims priority from Japanese application JP 2009-135729 filed on Jun. 5, 2009, the content of which is hereby incorporated by reference into this application.

EFFECTS OF THE INVENTION

According to the present invention, it is possible to obtain a soy sauce powder having a strong soy sauce flavor with simple operations in an advantageous manner in industrial practice.

DESCRIPTION OF THE PREFERRED EMBODIMENTS

The present invention is carried out by mixing soy sauce oil and an emulsifier with a soy sauce at first, agitating the mixture, allowing the mixture to stand still so as to separate the mixture into an oil phase and an aqueous phase, and subjecting the aqueous phase to spray drying.

Examples of soy sauce include any form of soy sauce such as dark soy sauce, light soy sauce, raw soy sauce, or pasteurized soy sauce. Also, a liquid preparation containing protein hydrolysates obtained by enzymatically or chemically hydrolyzing a soy sauce (a soy-sauce-like seasoning) can be used as soy sauce.

The term "soy sauce oil" collectively refers to fatty oil floating on the surface of soy sauce obtained by compressing generally available soy sauce moromi mash. Soy sauce oil can be obtained as a by-product during soy sauce production. In addition, any soy sauce oil obtained from whole soybean or defatted soybean can be used. However, when stale soy sauce oil is used, soy sauce aroma deteriorates. Therefore, if possible, fresh soy sauce oil should be used. The amount of added soy sauce oil in soy sauce is preferably 2% (v/v) or more and more preferably 3 to 15% (v/v). If the amount is less than 2% (v/v), the soy sauce aroma is weakened. On the other hand, if the amount exceeds 15% (v/v), the soy sauce aroma component content relative to the amount of added soy sauce oil cannot be increased to a sufficient extent, resulting in an increase in the amount of oil phase that should be separated. This is a drawback.

Any emulsifier can be used if it can be used as a food additive. In particular, examples of emulsifiers used in the present invention include glycerin fatty acid ester and sucrose fatty acid ester. A preferable example of glycerin fatty acid ester is polyglycerin fatty acid ester. In addition, an emulsifier having an HLB value (representing the balance of hydrophilicity and lipophilicity) of 10 to 16 is more preferable.

In addition, the amount of an emulsifier to be added is preferably 0.1% (w/v) or more, more preferably 0.3% to 3.0% (w/v), and most preferably 0.5% to 1.5% (w/v) based on the total amount of the solution obtained by adding soy sauce oil, an emulsifier, and, if necessary, water to soy sauce. If the amount is less than 0.1% (w/v), temporal emulsification of the oil phase and the aqueous phase cannot take place. If the amount exceeds 3.0% (w/v), the aqueous phase takes on an unpreferable soy sauce aroma.

Any means can be used for agitation treatment if it can be used for sufficient mixing of soy sauce and soy sauce oil. However, homogenizers, etc., which can cause strong agitation, are preferable.

Next, after agitation treatment, the mixture is allowed to stand still for a sufficient period of time for separation of an oil phase and an aqueous phase. Preferably, the period for static placement is at least 5 minutes. Such static placement facilitates separation of the oil phase and the aqueous phase. In addition, as a result of separation and collection of the aqueous phase, an aqueous phase containing soy-sauce-derived aroma components at high concentrations can be obtained.

Examples of an excipient added for spray drying that can be used include dextrin, gelatin, and soluble starch. The proportion of added excipient in the obtained aqueous phase is preferably 5% to 30% (w/v) and more preferably 15% to 25% (w/v). If the proportion is less than 5% (w/v), the soy sauce powder recovery rate decreases. On the other hand, if the proportion exceeds 30% (w/v), the taste of soy sauce is weakened. An excipient is added before the above agitation treatment or added to the aqueous phase obtained after agitation treatment.

Preferably, spray drying is carried out under conditions of an inlet hot air temperature of 120° C. to 200° C. and an outlet temperature of 80° C. to 100° C. If the temperatures are excessively low, the efficiency of spray drying decreases. On the other hand, if the temperatures are excessively high, a soy sauce powder takes on a burnt odor, which is not preferable.

As described above, according to the present invention, a soy sauce powder having a very strong soy sauce flavor can be readily obtained with simple operations and without the need of a step of preparing an aromatic substance.

Hereafter, the present invention is described in greater detail with reference to the following Examples.

Example 1

Production of a Soy Sauce Powder

A dark soy sauce (200 ml), soy sauce oil (25 ml), polyglycerin fatty acid ester (Riken Vitamin Co., Ltd.; Poem J-0381V) (2 g) to be used as an emulsifier, dextrin (Sanwa Cornstarch Co., Ltd.; Sandec 30) (40 g), and water (100 ml) were mixed and agitated for 30 minutes for complete dissolution of dextrin. In this Example, the Brix value of the mixture was 35. The obtained liquid mixture was heated to 70° C. and homogenized with a homogenizer (NISSEI Corporation; BM-2) under agitation conditions of 15,000 rpm for 20 minutes. Thereafter, the mixture was allowed to stand still at room temperature for 10 minutes for separation of an aqueous phase and an oil phase. The aqueous phase was collected and subjected to spray drying at an inlet temperature of 175° C. and an outlet temperature of 90° C. Thus, the soy sauce powder having a very strong soy sauce flavor of the present invention (common salt concentration: 28.0%; hereinafter sometimes referred to as "the present invention product") was obtained.

Control Example

For comparison, a control soy sauce powder (common salt concentration: 28.0%; hereinafter sometimes referred to as "conventional product") was obtained in the same manner as that used for the method for producing a soy sauce power of the present invention described above, except that soy sauce oil and an emulsifier were not added.

Comparative Example

In addition, for comparison, a soy sauce powder of the Comparative Example (hereinafter sometimes referred to as "Comparative Example product") was obtained in the same manner as that used for the method for producing a soy sauce power of the present invention described above, except that an emulsifier was not added.

Sensory tests were conducted by 17 panelists who were trained to have the ability to distinguish among flavors in order to examine the soy sauce powder of the present invention obtained in Example 1 in a pair test with the use of the conventional product or the Comparative Example product as a control soy sauce powder. Table 1 shows the results.

TABLE 1

| | Category | | |
|---|---|---|---|
| | Comparison of the present invention product (A) and the conventional product (B) | | |
| Item | Number of panelists who selected A | Number of panelists who selected B | Test |
| Degree of soy sauce flavor | 14 | 3 | ** |
| | Category | | |
| | Comparison of the present invention product (A) and the Comparative Example product (C) | | |
| Item | Number of panelists who selected A | Number of panelists who selected C | Test |
| Degree of soy sauce flavor | 17 | 0 | ** |

Note)
** Significant at a p value of 1%

The results shown in table 1 indicate that the present invention product has a soy sauce flavor that is much stronger than that of the conventional product and that of the Comparative Example product. In the case of the Comparative Example product, soy sauce oil was added to soy sauce; however, an emulsifier was not added. Meanwhile, in the case of the present invention product, soy sauce oil was added to soy sauce, and further, an emulsifier was added thereto. In such case, a soy sauce powder having a rich soy sauce flavor can be obtained. In addition, it is understood that, in the case of the present invention product, soy sauce flavor components contained in soy sauce oil can be readily transferred to soy sauce used as a starting material with good efficiency even if the step of preparing an aromatic substance is omitted, which is advantageous in industrial practice.

Example 2

The present invention product, the conventional product, and the Comparative Example product were collected (50 g each) and separately dissolved in water (100 ml). Thus, solutions containing the soy sauce powders dissolved therein at a common salt concentration of 16.5% (w/v) were prepared. The concentrations of representative soy sauce flavor components of each solution (ppm) were analyzed in accordance with "5-5: quantification of aroma components by gas chromatography" of the Soy Sauce Testing Method (Shoyu Shiken Ho) (edited by the Japan Soy Sauce Research Institute, published on Mar. 1, 1985, pp. 177 to 179). Table 2 shows the results.

TABLE 2

| Aroma component | Conventional product (ppm) | Present invention product (ppm) | Comparative Example product (ppm) |
|---|---|---|---|
| Isobutyl alcohol | 1.1 | 1.7 | 0.5 |
| n-butyl alcohol | 1.7 | 2.5 | 1.3 |
| Isoamyl alcohol | 1.9 | 2.6 | 1.4 |
| Ethyl lactate | 3.2 | 5.3 | 4.0 |

The results shown in table 2 indicate that the present invention product contains isobutyl alcohol, n-butyl alcohol, isoamyl alcohol, and ethyl lactate as soy sauce aroma components in amounts 1.5 to 3.4 times, 1.5 to 1.9 times, 1.4 to 1.9 times, and 1.3 to 1.7 times as great as those of the conventional product and those of the Comparative Example product, respectively. That is to say, it is understood that a soy sauce powder containing preferable soy sauce aroma components at high concentrations can be obtained according to the present invention.

All publications, patents, and patent applications cited herein are incorporated herein by reference in their entirety.

What is claimed is:

1. A method for producing a soy sauce powder having a strong soy sauce flavor, said method consisting of:
   mixing soy sauce oil and an emulsifier with a soy sauce, agitating the mixture,
   allowing the mixture to stand still so as to separate the mixture into an oil phase and an aqueous phase and to thereby transfer soy sauce flavor contained in the soy sauce oil to the aqueous phase, and
   subjecting the aqueous phase to spray drying.

2. The method according to claim 1, wherein the amount of soy sauce oil mixed with the soy sauce is 2 to 15% (v/v).

3. The method according to claim 1, wherein the amount of emulsifier present in the mixture is 0.1 to 3.0% (w/v), based on the total amount of solution obtained by adding the soy sauce oil and the emulsifier to the soy sauce.

4. The method according to claim 1, wherein the emulsifier is at least one selected from the group consisting of a glycerin fatty acid ester and a sucrose fatty acid ester.

5. The method according to claim 1, wherein the emulsifier has an HLB value of 10 to 16.

6. The method according to claim 1, wherein the mixture stands still for at least 5 minutes.

7. The method according to claim 1, wherein the spray drying is carried out under conditions of an inlet hot air temperature of 120-200° C. and an outlet temperature of 80-100° C.

8. The method according to claim 1, wherein the soy sauce powder having improved soy sauce flavor contains isobutyl alcohol in an amount at least 3.4 times greater than a soy sauce powder obtained by mixing soy sauce oil with a soy sauce, agitating the mixture, allowing the mixture to stand still so as to separate the mixture into an oil phase and an aqueous phase, and subjecting the aqueous phase to spray drying.

9. The method according to claim 8, wherein the soy sauce powder having improved soy sauce flavor contains n-butyl alcohol in an amount at least 1.9 times greater than a soy sauce powder obtained by mixing soy sauce oil with a soy sauce, agitating the mixture, allowing the mixture to stand still so as to separate the mixture into an oil phase and an aqueous phase, and subjecting the aqueous phase to spray drying.

10. The method according to claim 9, wherein the soy sauce powder having improved soy sauce flavor contains isoamyl alcohol in an amount at least 1.9 times greater than a soy sauce powder obtained by mixing soy sauce oil with a soy sauce, agitating the mixture, allowing the mixture to stand still so as to separate the mixture into an oil phase and an aqueous phase, and subjecting the aqueous phase to spray drying.

11. The method according to claim 10, wherein the soy sauce powder having improved soy sauce flavor contains ethyl lactate in an amount at least 1.3 times greater than a soy sauce powder obtained by mixing soy sauce oil with a soy sauce, agitating the mixture, allowing the mixture to stand still so as to separate the mixture into an oil phase and an aqueous phase, and subjecting the aqueous phase to spray drying.

12. A method for producing a soy sauce powder having a strong soy sauce flavor, said method consisting of:
    mixing soy sauce oil and an emulsifier with a soy sauce, agitating the mixture,
    allowing the mixture to stand still so as to separate the mixture into an oil phase and an aqueous phase and to thereby transfer soy sauce flavor contained in the soy sauce oil to the aqueous phase, and subjecting the aqueous phase to spray drying,
    wherein an excipient is added to the mixture before the agitating or the excipient is added to the aqueous phase obtained after the agitating.

13. The method according to claim 12, wherein the amount of excipient present in the aqueous phase is 5 to 30% (w/v).

14. The method according to claim 12, wherein the excipient is at least one selected from the group consisting of dextrin, gelatin and soluble starch.

* * * * *